July 27, 1937.  R. B. COTTRELL  2,088,291
TRUCK
Filed Sept. 24, 1932   3 Sheets-Sheet 1
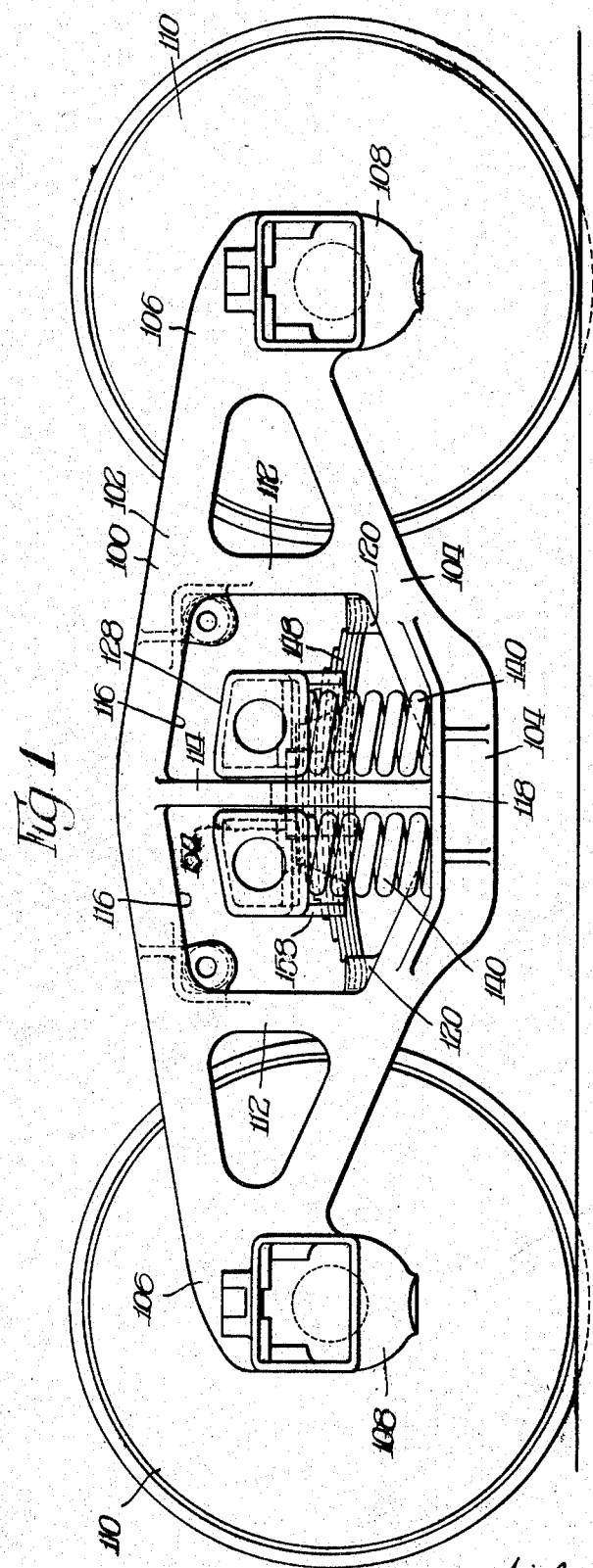
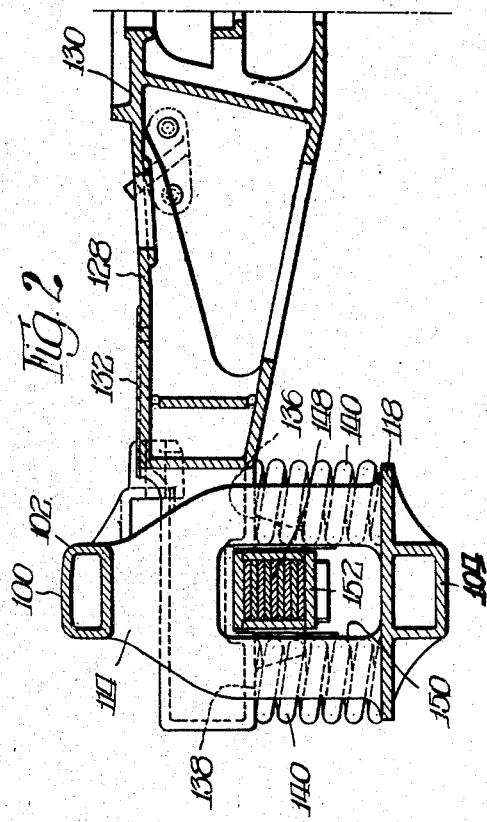
Inventor:
Robert B. Cottrell,
By Wilkinson, Huxley, Byron & Knight
Attys.

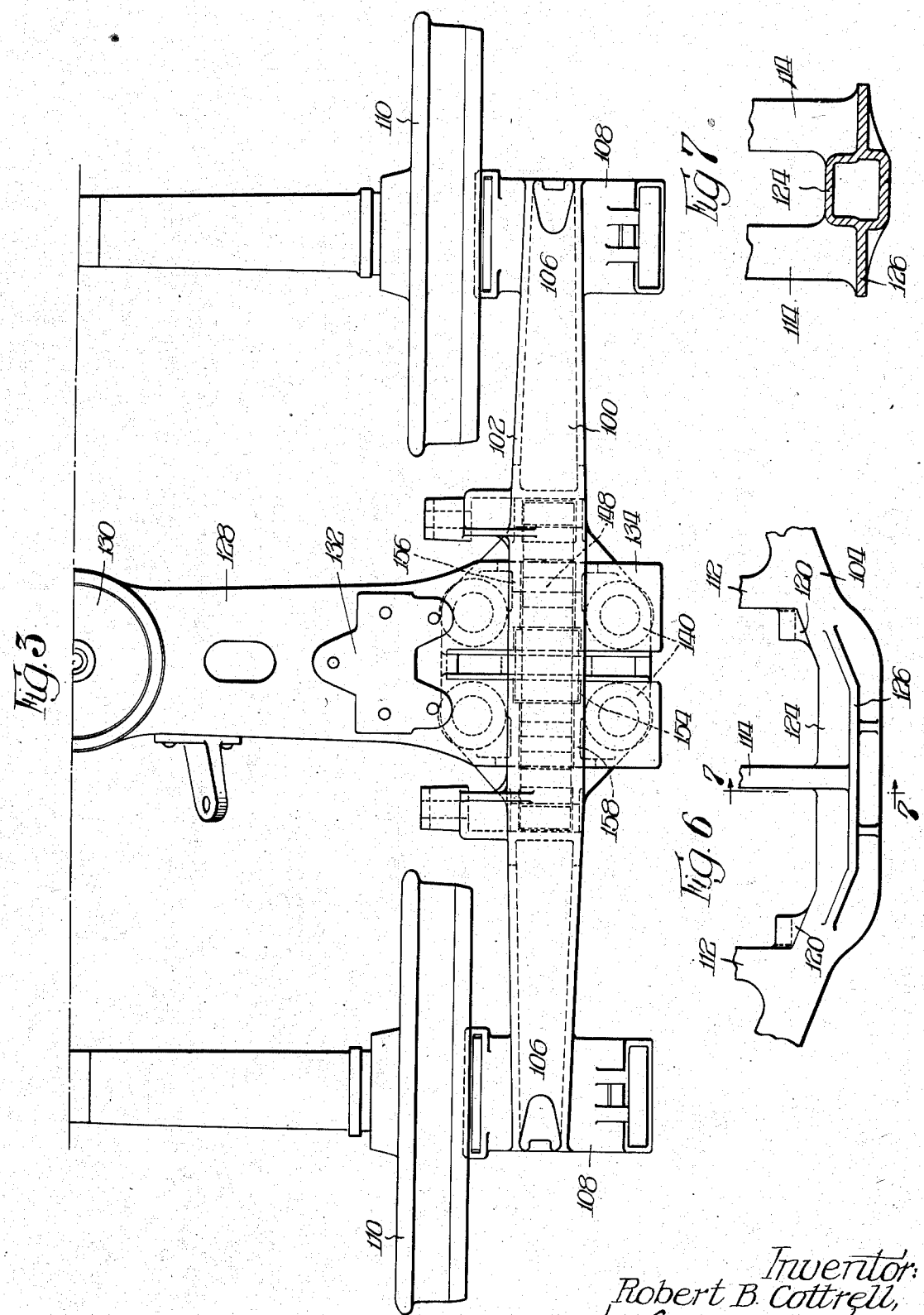

July 27, 1937. R. B. COTTRELL 2,088,291
TRUCK
Filed Sept. 24, 1932  3 Sheets-Sheet 3
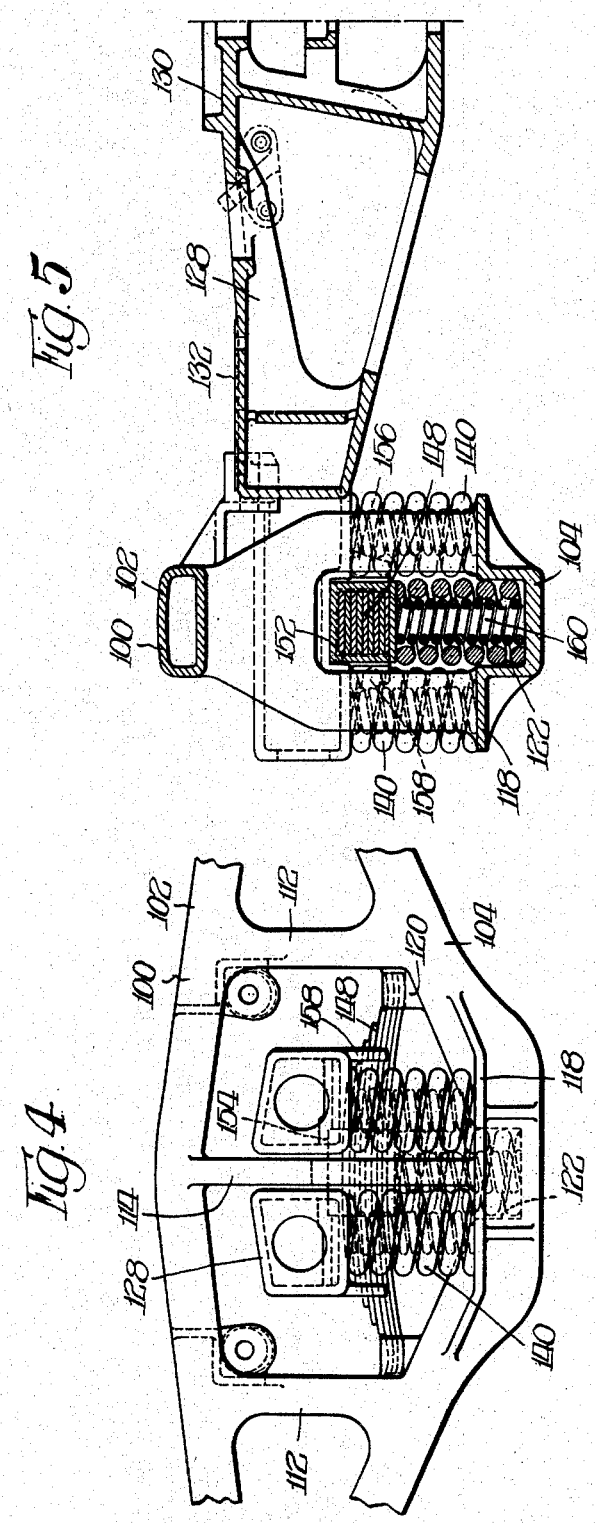
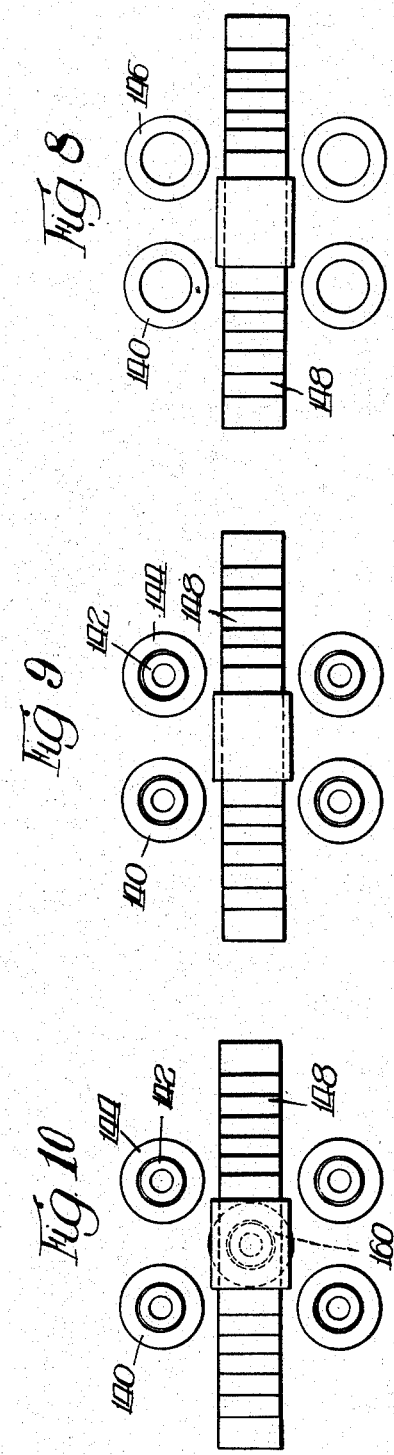
Inventor:
Robert B. Cottrell,
By Wilkinson, Huxley, Byron & Knight
Attys.

Patented July 27, 1937

2,088,291

UNITED STATES PATENT OFFICE 2,088,291

TRUCK

Robert B. Cottrell, Chicago, Ill., assignor to American Steel Foundries, Chicago, Ill., a corporation of New Jersey Application September 24, 1932, Serial No. 634,747

51 Claims. (Cl. 105—197.1)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A different object is to provide a side frame construction of great strength, rigidity and simplicity of construction and design wherein provision is made to position spring members and transmit thrusts therefrom to the side frame.

Yet another object of the invention is to provide a truck construction wherein quick and inexpensive wheel change can be effected.

A further object is to provide a truck construction wherein no column wear takes place, and increased spring capacity is provided, as well as increased strength, without increased weight.

A still further object is to provide a truck construction wherein springs of different character may be arranged for initial serial or parallel operation.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation of a form of truck construction embodying the invention;

Figure 2 is a transverse fragmentary sectional elevation of the truck construction shown in Figure 1, the same being taken substantially in the plane of the transverse center line thereof;

Figure 3 is a fragmentary top plan view of the truck construction shown in Figures 1 and 2;

Figure 4 is a fragmentary side elevation of another modified form of truck construction embodying the invention;

Figure 5 is a transverse sectional elevation of the truck construction shown in Figure 4, the same being taken substantially in the plane of the transverse center line thereof;

Figure 6 is a fragmentary side elevation of a modified form of truck side frame for a truck construction embodying the invention;

Figure 7 is a transverse fragmentary sectional elevation taken substantially in the plane of the line 7—7 of Figure 6;

Figures 8 and 9 are top plan views of a four-coil spring arrangement adapted for use with the truck construction embodying the invention;

Figure 10 is a top plan view of a five-coil spring arrangement for a truck construction embodying the invention.

In the truck constructions illustrated in Figures 1 to 7 inclusive, the truck side frame 100 consists essentially of the compression member 102 and the tension member 104 merging adjacent the ends thereof as at 106 and being provided with the journal boxes 108 disposed in cooperative relation to the journal ends of the wheel and axle assembly 110. The tension and compression members are shown as of substantially box-section, though of course it will be appreciated that any suitable section may be used, such as a modified U-section, or any other desired section. The tension and compression members are integrally connected by means of the spaced struts 112 and 114, the strut 114 being disposed adjacent the transverse center line of the truck and intermediate the spaced struts 112 whereby adjacent windows 116 are provided. The upper chord of the tension member 104 slopes downwardly and merges into the widened spring seat 118 of the tension member adjacent the center strut 114, and the tension member 104 is provided with the spaced aligned leaf spring seats 120 disposed thereon adjacent the struts 112.

In the construction shown in Figures 4 and 5, the tension member adjacent the strut 114 is provided with a well, recess, or coil spring seat 122 for permitting a spring grouping wherein five-coil spring nests are used, such as shown in Figure 10.

In the truck construction shown in Figures 6 and 7, the tension member 104 is disposed with the elongated box section 124 adjacent the strut 114, and the coil spring seat 126 corresponding to the coil spring seat 118 is disposed intermediate the top and bottom chords of the member 124.

The load carrying member, which in the form shown is the bolster 128, is of the conventional form provided with the center bearing 130 and the side bearing 132. The end portion, however, is bifurcated as at 134, the bifurcated portions being provided with the inner and outer coil spring seats 136 and 138 supported on the coil spring groups 140 arranged on each side of the central strut 114 and supported on the coil spring seats 118. The coil spring groups may be made up of inner or outer coil springs 142 and 144 such as shown in Figures 9 and 10, or they may be made up in the single coil groups 146, such as shown in Figure 8.

The coil spring groups 140 are disposed in pairs inwardly and outwardly of the semi-elliptic leaf spring assembly 148, said leaf spring assembly being supported on the seats 120 and extending through the opening 150 provided in the central strut 114, being provided with the spring band 152 receivable in the recessed seat 154 provided in the bifurcated end portions 134 of the bolster 128. The bolster is provided with the depending spaced inner and outer lugs or flanges 156 and 158 embracing the leaf spring whereby, in conjunction with the recessed portion 154, the bolster is maintained in squared relation with the side frame, or in other words, the elliptic springs serve to resist the transverse loads of the car as well as serving to transmit the longitudinal loads against the inside edges of the struts 112 whereby no loads are normally transmitted through the central strut 114, thus preventing wear on the strut and on the bolster. The central strut is, however, a safety factor in the event that the spring band should slip due to longitudinal shocks and loads.

In the construction shown in Figures 4 and 5, the spring group 160 is arranged in supporting relation to the leaf spring engaging the spring band 152 and being supported in the spring recess 122 whereby the five-coil grouping is arranged as illustrated in Figure 10.

With the constructions shown, it will be appreciated that a truck is provided wherein wheel changes may be made quickly, as all that is necessary to change the wheels is to remove the brake hanger pins, raise the bolster till it clears the elliptic springs, and remove the side frames. This of course is very simple, quick and cheap as compared to the labor necessary to change the ordinary type of truck in which the truck has to be completely dismantled to change the wheels. Easier riding qualities are also obtained by combining a leaf and coil spring arrangement, as the oscillations of one group of springs serve to dampen the oscillations of another. No column wear can take place in the type of truck illustrated as there is no bearing engagement between the bolster and any column or struts provided. It is of course understood that the type of truck illustrated may also be used in conjunction with the spring arrangement shown in the truck illustrated in Patent No. 1,970,841 granted August 21, 1934 whereby the same advantage would accrue. Increased spring capacity is obtained by the arrangement of the trucks illustrated; further, a very light helical spring may be used as the capacity of the springs is supplemented by that of the leaf springs. In this type of truck the spaced struts tend to make the loads more widely distributed whereby a truck frame of increased strength is provided, and of course a much lighter truck may be provided with this type of side frame, as no spring plank is necessary.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a car truck, the combination of a side frame including tension and compression members connected by spaced struts forming a plurality of windows, one of said struts being disposed on the transverse center line of said side frame, a load carrying member having a portion embracing one of said struts and extending into said windows, and resilient means of different character disposed in each of said windows and supporting said load carrying member on said side frame, said resilient means including friction means extending into a plurality of said windows.

2. In a car truck, a side frame comprising an upper compression member, a lower tension member, a column connecting said compression and tension members at the transverse center line thereof, springs supported on said tension member on each side of said column, some of said springs being offset from the longitudinal center line of said side frame and in the plane of said column.

3. In a car truck, the combination of a side frame having tension and compression members, spaced struts and an intermediate strut integrally connecting said tension and compression members and forming windows, spaced seats provided on said tension member adjacent said spaced struts, said tension member being provided with seats intermediate said spaced seats, a load carrying member supported on said side frame by a leaf spring supported on said spaced seats and coil springs supported on said intermediate seats.

4. In a car truck, the combination of a side frame having tension and compression members, spaced struts and an intermediate strut integrally connecting said tension and compression members and forming windows, spaced seats provided on said tension member adjacent said spaced struts, said tension member being provided with seats intermediate said spaced seats, a load carrying member supported on said side frame by a longitudinally disposed semi-elliptic spring supported on said spaced seats and coil springs supported on said intermediate seats.

5. In a car truck, the combination of a side frame having tension and compression members, spaced struts and an intermediate strut integrally connecting said tension and compression members and forming windows, spaced seats provided on said tension member adjacent said spaced struts, said tension member being provided with seats intermediate said spaced seats, said intermediate strut being provided with a slot, a load carrying member supported on said side frame by a leaf spring supported on said spaced seats and coil springs supported on said intermediate seats, said leaf spring extending through said slot.

6. In a car truck, the combination of a side frame having tension and compression members, spaced struts and an intermediate strut integrally connecting said tension and compression members and forming windows, spaced seats provided on said tension member adjacent said spaced struts, said tension member being provided with seats intermediate said spaced seats, said intermediate strut being provided with a slot, a load carrying member supported on said side frame by a leaf spring supported on said spaced seats and coil springs supported on said intermediate seats, said leaf spring extending through said slot, and positioning means on said load carrying member embracing said leaf spring.

7. In a car truck, the combination of a side frame having tension and compression members, spaced struts integrally connecting said tension and compression members and forming windows, spaced seats provided on said tension member adjacent certain of said spaced struts, said tension member being provided with seats intermediate said spaced seats, a load carrying member extending into said windows and supported on said side frame by a leaf spring supported on said spaced seats and coil springs supported on said intermediate seats and disposed on each side of said leaf spring.

8. In a car truck, the combination of a side frame having tension and compression members, spaced struts integrally connecting said tension and compression members and forming windows, spaced seats provided on said tension member adjacent certain of said spaced struts, said tension member being provided with seats intermediate said spaced seats, a load carrying member supported on said side frame by a leaf spring supported on said spaced seats and coil springs supported on said intermediate seats and disposed on each side of said leaf spring, and a coil spring disposed between said side frame and said leaf spring.

9. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member supported on said side frame by a leaf spring supported on said spaced seats and coil springs supported on said intermediate seats and disposed on each side of said leaf spring, and a coil spring disposed between said side frame and said leaf spring, said last named coil spring extending into a pocket formed in said tension member.

10. In a car truck, the combination of a side frame having tension and compression members, spaced struts integrally connecting said tension and compression members and forming windows, spaced seats provided on said tension member adjacent said spaced struts, said tension member being provided with a seat intermediate said spaced seats, a load carrying member supported on said side frame by a leaf spring supported on said spaced seats, and a coil spring disposed between said side frame and said leaf spring, and engaging the other of said seats and said leaf spring.

11. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member supported on said side frame by a leaf spring supported on said spaced seats, a coil spring disposed between said side frame and said leaf spring and extending into a pocket formed in said tension member, and coil springs disposed between the other of said seats and said load carrying member.

12. In a car truck, the combination of a side frame having tension and compression members, spaced struts integrally connecting said tension and compression members and forming windows, one of said struts being disposed substantially on the transverse center line of said side frame, spaced seats provided on said tension member, said tension member being provided with seats intermediate said spaced seats, a load carrying member supported on said side frame by a leaf spring supported on said spaced seats and coil springs supported on said intermediate seats, said load carrying member being provided with a recess adapted to receive a portion of said leaf spring.

13. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member supported on said side frame by a leaf spring supported on said spaced seats and coil springs supported on said intermediate seats, said load carrying member being provided with a recess adapted to receive a portion of said leaf spring, and positioning means on said load carrying member embracing said leaf spring.

14. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member supported on said side frame by a leaf spring supported on said spaced seats and coil springs supported on said intermediate seats and disposed on each side of said leaf spring, and a coil spring disposed between said side frame and said leaf spring, said load carrying member being provided with a recess adapted to receive a portion of said leaf spring.

15. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member supported on said side frame by a leaf spring supported on said spaced seats and coil springs supported on said intermediate seats and disposed on each side of said leaf spring, a coil spring disposed between said side frame and said leaf spring, said load carrying member being provided with a recess adapted to receive a portion of said leaf spring, and positioning means on said load carrying member embracing said leaf spring.

16. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats and substantially below the top chord of said tension member adjacent the transverse center line of said truck, and a load carrying member supported on said side frame by a leaf spring supported on said spaced seats and coil springs supported on said intermediate seats.

17. In a side frame, the combination of tension and compression members merging adjacent the ends thereof and provided with journal boxes, spaced struts and an intermediate strut integrally connecting said tension and compression members and forming a plurality of windows, the tension member intermediate said spaced struts being provided with spring seats for springs of different character, one of said struts being apertured to accommodate a spring.

18. In a side frame, the combination of tension and compression members merging adjacent the ends thereof and provided with journal boxes, spaced struts and an intermediate strut integrally connecting said tension and compression members and forming a plurality of windows, the tension member intermediate said spaced struts being provided with spring seats, one of said seats being disposed in a recess provided in said tension member and on the transverse center line of said frame, one of said struts being apertured to accommodate a spring.

19. In a side frame, the combination of tension and compression members merging adjacent the ends thereof and provided with journal boxes, spaced struts and an intermediate centrally disposed strut integrally connecting said tension and compression members and forming a plurality of windows, the tension member intermediate said spaced struts being provided with spring seats, said seats being substantially aligned with the top chord of said tension member adjacent said intermediate strut, one of said struts being apertured to accommodate a spring.

20. In a side frame, the combination of tension and compression members merging adjacent the ends thereof and provided with journal boxes, spaced struts and an intermediate centrally disposed strut integrally connecting said tension and compression members and forming a plurality of windows, the tension member intermediate said spaced struts being provided with spring seats, said seats being substantially aligned with the top chord of said tension member adjacent said intermediate strut, and another seat disposed in a recess provided in said tension member.

21. In a side frame, the combination of tension and compression members merging adjacent the ends thereof and provided with journal boxes, spaced struts and an intermediate strut integrally connecting said tension and compression members and forming a plurality of windows, the tension member in said windows being provided with spring seats, and spaced additional spring seats formed on said tension member adjacent said spaced struts and in said windows for accommodating springs of different character than applied to said other seats.

22. In a side frame, the combination of tension and compression members merging adjacent the ends thereof and provided with journal boxes, spaced struts and an intermediate strut integrally connecting said tension and compression members and forming a plurality of windows, the tension member intermediate said spaced struts being provided with spring seats, one of said seats being disposed in a recess provided in said tension member, and spaced additional seats formed on said tension member adjacent said spaced struts and in said windows, one of said struts being apertured to accommodate a spring.

23. In a side frame, the combination of tension and compression members merging adjacent the ends thereof and provided with journal boxes, spaced struts and an intermediate strut integrally connecting said tension and compression members and forming a plurality of windows, the tension member in said windows being provided with spring seats, said seats being substantially aligned with the top chord of said tension member adjacent said intermediate strut, and spaced additional seats formed on said tension member adjacent said spaced struts and in said windows for accommodating springs of different character than applied to said other seats, one of said struts being apertured to accommodate a spring.

24. In a side frame, the combination of tension and compression members merging adjacent the ends thereof and provided with journal boxes, spaced struts and an intermediate strut integrally connecting said tension and compression members and forming a plurality of windows, the tension member intermediate said spaced struts being provided with spring seats, said seats being substantially aligned with the top chord of said tension member adjacent said intermediate strut, and another seat disposed in a recess provided in said tension member, and spaced additional seats formed on said tension member adjacent said spaced struts and in said windows.

25. In a bolster, the combination of a body portion having center and side bearings, an end portion having spring seats and column cooperating portions spaced to form a column embracing recess disposed on the longitudinal center line of said bolster, said end portion being provided with another recess for accommodating a spring of different character than the springs adapted to engage said seats.

26. In a bolster, the combination of a body portion having center and side bearings, an end portion having spring seats and column cooperating portions, said end portion being provided with a recess for accommodating a spring of different form than the springs adapted to engage said seats, said recess being intermediate said seats, said bolster having spring positioning means independent of the recess forming portions of the bolster and adapted to have co-operative relation to said spring engaging in said recess.

27. In a bolster, the combination of a body portion having center and side bearings, a bifurcated end portion having spring seats thereon, said end portion being provided with a recess for accommodating a spring of different form than the springs adapted to engage said seats, said recess being intermediate said seats.

28. In a side frame, the combination of journal boxes, spaced seats for a leaf spring, coil spring seats between said spaced seats, and a strut member between said coil spring seats and having an interrupted portion for accommodating the leaf spring adapted to be disposed between said spaced seats.

29. In a side frame, the combination of journal boxes, spaced seats for a leaf spring, coil spring seats between said spaced seats, one of said coil spring seats being disposed in a recess, and a strut member having an interrupted portion for accommodating the leaf spring disposed between said spaced seats.

30. In a side frame, the combination of tension and compression members, integral connecting spaced strut members connecting said tension and compression members, an intermediate strut integrally connecting said tension and compression members, said tension and compression members merging adjacent the ends of said frame and being provided with journal boxes, spaced seats for a leaf spring disposed on said tension member and adjacent said spaced strut members, coil spring seats disposed on said tension member adjacent said intermediate strut, said intermediate strut having an interrupted portion for accommodating the leaf spring disposed between said spaced seats.

31. In a side frame, the combination of tension and compression members, integral connecting spaced strut members connecting said tension and compression members, an intermediate strut integrally connecting said tension and compression members, said tension and compression members merging adjacent the ends of said frame and being provided with journal boxes, spaced seats for a leaf spring disposed on said tension member and adjacent said spaced strut members, coil spring seats disposed on said tension member adjacent said intermediate strut, one of said coil spring seats being disposed in a recess, said intermediate strut having an interrupted portion for accommodating the leaf spring disposed between said spaced seats.

32. In a car truck, the combination of a side frame including tension and compression members merging adjacent the ends thereof and provided with journal boxes, spaced integral struts connecting said tension and compression members, one of said struts being disposed on the transverse center line of said side frame, a load carrying member having an end thereof disposed between said struts, the end of said load carrying member being recessed to receive a portion of a semi-elliptic spring disposed to be seated on spaced seats fixed on said side frame longitudinally thereof, and resilient means disposed on other fixed seats disposed on said side frame adjacent said spring for supporting said load carrying member.

33. In a car truck, the combination of a side frame including tension and compression members merging adjacent the ends thereof and provided with journal boxes, spaced integral struts connecting said tension and compression members, one of said struts being disposed on the transverse center line of said side frame, a load carrying member having an end thereof disposed between said struts, the end of said load carrying member being recessed to receive a portion of resilient means disposed to be seated on spaced seats fixed on said side frame longitudinally thereof, and resilient means of different form from said first named resilient means disposed on other fixed seats disposed on said side frame adjacent said first named resilient means whereby said resilient means supports said load carrying member.

34. In a truck, the combination of a side frame including a beam member, a vertically disposed strut disposed on said beam member adjacent the transverse center line of said truck, a load carrying member embracing said strut, and coil and leaf springs seated on said side frame and engaging said load carrying member for resilient support thereof, said strut being apertured to accommodate one of said springs, said leaf spring being supported on spaced seats fixed on said beam member.

35. In a truck, the combination of a side frame including a beam member, a vertically disposed strut disposed on said beam member adjacent the transverse center line of said truck, a load carrying member embracing said strut, and coil and leaf springs seated on said side frame and engaging said load carrying member for resilient support thereof, said leaf spring being arranged longitudinally of the truck.

36. In a car truck, the combination of a side frame having tension and compression members and spaced connecting struts disposed therebetween forming a plurality of windows, said tension member having upper and lower members, a leaf spring supported on said upper member on spaced fixed seats, said seats being in adjacent windows, a load carrying member supported on said leaf spring, and a spring of different form from said leaf spring for supporting said load carrying member in parallel with said leaf spring, said last named spring being seated on said lower member.

37. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member extending into said windows and supported on said side frame by a leaf spring supported on said spaced seats and coil springs supported on said intermediate seats and disposed on each side of said leaf spring, and a coil spring disposed between said side frame and said leaf spring.

38. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member extending into said windows and supported on said side frame by a leaf spring supported on said spaced seats and coil springs supported on said intermediate seats and disposed on each side of said leaf spring, and a coil spring disposed between said side frame and said leaf spring, said last named coil spring extending into a pocket formed in said tension member.

39. In a car truck, the combination of a side frame having tension and compression members, spaced struts integrally connecting said tension and compression members and forming windows, spaced seats provided on said tension member adjacent said spaced struts, said tension member being provided with a seat intermediate said spaced seats, a load carrying member extending into said windows and supported on said side frame by a leaf spring supported on said spaced seats, and a coil spring disposed between said side frame and said leaf spring and engaging the other of said seats.

40. In a car truck, the combination of a side frame having tension and compression members, spaced struts integrally connecting said tension and compression members and forming windows, spaced seats provided on said tension member adjacent said spaced struts, said tension member being provided with seats intermediate said spaced seats, a load carrying member extending into said windows and supported on said side frame by a leaf spring supported on said spaced seats, a coil spring disposed between said side frame and said leaf spring and extending into a pocket formed in said tension member, and coil springs disposed between the other of said seats and said load carrying member.

41. In a car truck, the combination of a side frame having tension and compression members, spaced struts integrally connecting said tension and compression members and forming windows, spaced seats provided on said tension member adjacent said spaced struts, said tension member being provided with a seat intermediate said spaced seats, a load carrying member extending into said windows and supported on said side frame by a leaf spring supported on said spaced seats, and a coil spring disposed between said side frame and said leaf spring and engaging the other of said seats.

42. In a car truck, the combination of a side frame having tension and compression members, spaced struts integrally connecting said tension and compression members and forming windows, spaced seats provided on said tension member adjacent said spaced struts, said tension member being provided with a seat intermediate said spaced seats, a load carrying member extending into said windows and supported on said side frame by a leaf spring supported on said spaced seats, and a coil spring disposed between said side frame and load carrying member and engaging the other of said seats.

43. In a car truck, the combination of a side frame having tension and compression members, spaced struts integrally connecting said tension and compression members and forming windows, spaced seats provided on said tension member in adjacent windows adjacent certain of said spaced struts, and a load carrying member extending into said windows and supported on said side frame by a leaf spring supported on said spaced seats.

44. In a car truck, the combination of a side frame having tension and compression members, spaced struts and an intermediate strut integrally connecting said tension and compression members and forming windows, spaced seats provided on said tension member adjacent said spaced struts, a load carrying member extending into said windows and supported on said side frame by a leaf spring supported on said spaced seats, said intermediate strut being slotted to permit passage of said leaf spring therethrough.

45. In a car truck, the combination of a side frame having tension and compression members, spaced struts and an intermediate strut integrally connecting said tension and compression members and forming windows, spaced seats provided on said tension member in said window adjacent said spaced struts, a load carrying member extending into said windows and supported on said side frame by a leaf spring supported on said spaced seats, said intermediate strut being slotted to permit passage of said leaf spring therethrough.

46. In a side frame, the combination of tension and compression members merging adjacent the ends thereof and provided with journal boxes, spaced struts and an intermediate strut integrally connecting said tension and compression members, and leaf spring seats on said tension member adjacent said spaced struts, said intermediate strut being provided with a slot for permitting passage of a leaf spring therethrough.

47. In a side frame, the combination of tension and compression members merging adjacent the ends thereof and provided with journal boxes, spaced struts and an intermediate strut integrally connecting said tension and compression members, and leaf spring seats on said tension member adjacent said spaced struts, said intermediate strut being provided with a slot for permitting passage of a leaf spring therethrough, the intermediate strut adjacent said slotted portion providing a guide for said leaf spring.

48. In a bolster, the combination of a body portion having center and side bearings, an end portion having spring co-operating means and column co-operating portions, said end portion being provided with a recess for accommodating a spring of different form than the springs adapted to engage said means, said recess being intermediate said means, said bolster having spring positioning means independent of the recess forming portions of the bolster and adapted to have co-operative relation to said spring engaging in said recess.

49. In a car truck, the combination of a side frame including tension and compression members connected by spaced struts forming a plurality of windows, a load carrying member having a portion embracing one of said struts and extending into said windows, and resilient means of different character disposed in each of said windows and supporting said load carrying member on said side frame, said resilient means including friction means, said friction means extending between and in adjacent windows.

50. In a car truck, the combination of a side frame having a plurality of windows, a load carrying member having portions extending into each of said windows, and resilient means of different character disposed in each of said windows and supporting said load carrying member on said side frame, said resilient means including friction means, said friction means extending between and in adjacent windows.

51. In a car truck, the combination of a side frame having tension and compression members, spaced struts integrally connecting said tension and compression members and forming windows, spaced seats provided on said tension member adjacent said spaced struts and in certain of said windows, said tension member being provided with a seat intermediate said spaced seats, a load carrying member supported on said side frame by a leaf spring supported on said spaced seats, and a coil spring disposed between said side frame and load carrying member and engaging the other of said seats.

ROBERT B. COTTRELL.